Patented Mar. 13, 1934

1,951,328

UNITED STATES PATENT OFFICE 1,951,328

FORM OF LEAVENING INGREDIENT

Augustus H. Fiske, Warren, R. I., assignor to Rumford Chemical Works, Rumford, R. I., a corporation of Rhode Island No Drawing. Application May 16, 1931, Serial No. 538,004

8 Claims. (Cl. 99—10)

In producing baking powder it has been shown that the relation of the grain size must be definite in order to provide the necessary keeping quality. The problem was to decrease the number of contact points between the soda and phosphate and this was done by providing the phosphate in particles of substantial size. This was the basis of the patent to Catlin of 1892, (No. 474,811).

The difficulty under the Catlin system was that such larger particles or units of the phosphate were somewhat slow to dissolve in the liquid of the batter and when undissolved or only partially so acted as solid particles on the crust causing an immediate conduction of heat from the oven air into the crust or surface of the batter causing a brown speck to form as if the batter had been in contact with the pan at that point.

While this is a mere caramelization of the starch or sugar it has been unsightly and a basis of objection and so commercially of importance.

The use of phosphate in fine particles involves the difficulty of their adherence to the larger particles of soda. Such intimate contact is apt to result in reactions between the particles so that the baking powder did not keep well and lost strength.

My present concept is that of an arbitrary phosphate granule of the desired relative size but made up of fine readily soluble phosphate so that while of definite physical size as a granule it is in fact an agglomerate of much finer particles which would, if free, make reactive contact with the soda with the undesirable results above noted.

Such granules may be made up in various ways as by the use of a soluble binder such as gelatine, starch paste or sugar solutions which will not dissolve the phosphate to any appreciable extent but cause an agglomeration of the fine particles into grains which will readily disintegrate and so become soluble in the fluid of the batter.

In accordance with my invention the phosphate is pulverized so that it will pass through a No. 18 silk screen which is of approximately 170 mesh, giving particles of a specification of 0.0025 to 0.0037 of an inch. This is, of course, illustrative as the size may be varied, but is intended to indicate the considerable degree of fineness made possible with the attendant advantages accruing.

The granules themselves are preferably of the size of the soda particles which in most baking powders will pass 86 apertures to an inch but will not pass 170 apertures to an inch, the size being approximately .0030 inch to .0080 inch.

I may also form my granule by using a nucleus of soluble material and then causing the fine phosphate to adhere to it. I can heat the phosphate and cause it to become imbedded into the material. I may wash the material with a gelatine solution and then cause the fine phosphate to adhere to it. No matter what the basis of coherence may be, my invention in general is to form a granule of fine phosphate which will be cemented together or held on the surface of a soluble nucleus and will dissolve very quickly in the batter.

I may, in a similar manner, form a soda particle built up of fine particles of soda with a soluble cement or nucleus. In other words, I may use this type of granule for either of the active ingredients of baking powder as it is necessary for proper keeping quality to have granular soda and granular phosphate.

Such a baking powder with one or both reactants formed as agglomerated granules has a high keeping quality and strength and due to its form is quick acting in use. It constitutes a new type of baking powder and one having definitely novel characteristics and properties.

What I therefore claim and desire to secure by Letters Patent is:

1. In a baking powder, a reactant granule consisting of an agglomeration of finely divided particles solubly bonded in unitary form.

2. In a baking powder, a soda reactant of sized particles and a phosphatic reactant consisting of sized agglomerated fine particles of the phosphate with a soluble edible binder.

3. In a baking powder, a reactant in granular form consisting of fine particles of fine phosphate and a soluble edible bonding nucleus holding the particles together in grain units while dry.

4. In a baking powder, a pair of reactants consisting of sized granules, one of said granular reactants consisting of substantially uniform fine particles agglomerated with a relatively more soluble edible binder holding the particles together in granular unit size while dry.

5. In a baking powder, a granular reactant element consisting of agglomerated fine particles of a reactant and an edible binder of greater solubility than the reactant particles whereby the said granule may be disintegrated in a batter mix to free the fine particles of the reactant for prompt solution and reaction with a co-reactant when mixed in the batter.

6. In a baking powder, a granular reactant element consisting of agglomerated fine particles of a phosphate and an edible binder of greater solubility than the reactant particles whereby the said granule may be disintegrated in a batter mix to free the fine particles of the reactant for prompt solution and reaction with a co-reactant when mixed in the batter.

7. A granular reactant element for baking powder or like use, consisting of agglomerated fine particles of a reactant and an edible binder of greater solubility than the reactant particles whereby the said granule may be disintegrated in a batter mix to free the fine particles of the reactant for prompt solution and reaction with a co-reactant when mixed in the batter.

8. A granular reactant element for baking powder or like use, consisting of agglomerated fine particles of a phosphate and an edible binder of greater solubility than the reactant particles whereby the said granule may be disintegrated in a batter mix to free the fine particles of the reactant for prompt solution and reaction with a co-reactant when mixed in the batter.

AUGUSTUS H. FISKE.